Figure 1:
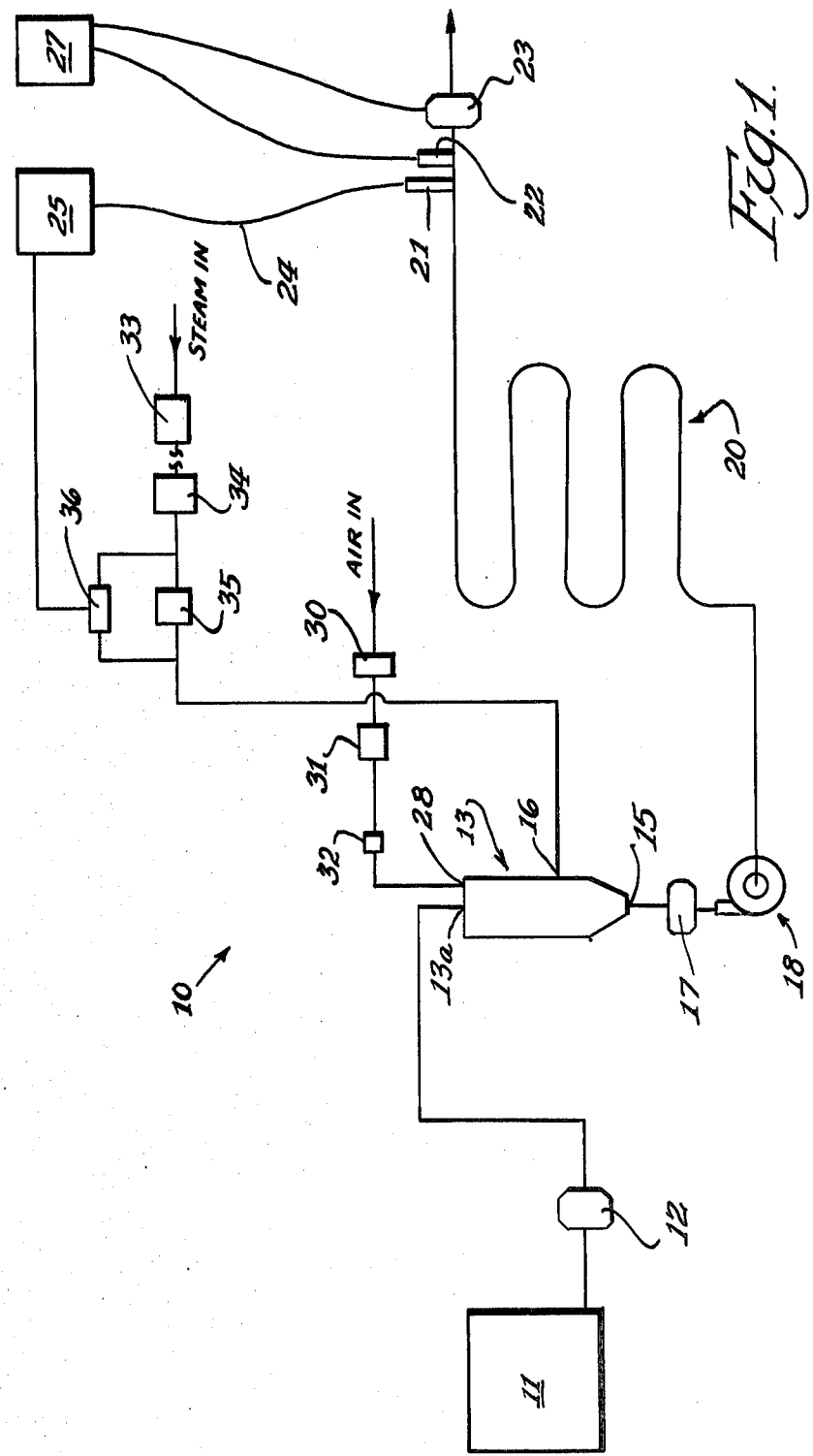

United States Patent [19]

Wakeman

[11] 4,161,909
[45] Jul. 24, 1979

[54] ULTRAHIGH TEMPERATURE HEATING SYSTEM

[75] Inventor: Alden H. Wakeman, Lake Mills, Wis.

[73] Assignee: Crepaco, Inc., Lake Mills, Wis.

[21] Appl. No.: 940,718

[22] Filed: Sep. 8, 1978

[51] Int. Cl.² ............................................. A23C 3/02
[52] U.S. Cl. ...................................... 99/453; 99/467; 99/483
[58] Field of Search ................. 99/453, 452, 467, 468, 99/473, 474, 483, 516

[56] References Cited

U.S. PATENT DOCUMENTS

| | | | |
|---|---|---|---|
| 1,819,023 | 8/1931 | Grindrod | 99/453 X |
| 1,987,665 | 1/1935 | Brunner | 99/453 X |
| 2,846,320 | 8/1958 | Wittwer | 99/453 |
| 2,901,225 | 8/1959 | Abrams | 99/453 X |
| 2,909,985 | 10/1959 | Abrams | 99/453 |
| 3,041,958 | 7/1962 | Abrams et al. | 99/453 |
| 3,156,176 | 11/1964 | Wakeman et al. | 99/453 |
| 3,450,022 | 6/1969 | Engel | 99/453 |
| 3,451,327 | 6/1969 | Nelson | 99/453 |
| 3,896,716 | 7/1975 | Carasso | 99/453 X |
| 3,980,011 | 9/1976 | Hermans | 99/453 |

FOREIGN PATENT DOCUMENTS

| | | | |
|---|---|---|---|
| 538399 | 6/1955 | Belgium | 99/453 |
| 937782 | 9/1963 | United Kingdom | 99/453 |

Primary Examiner—Stanley N. Gilreath
Attorney, Agent, or Firm—Neuman, Williams, Anderson & Olson

[57] ABSTRACT

An ultrahigh temperature heating system is provided for use in obtaining controlled heating of a liquid product. The system includes an upright chamber into which a controlled amount of liquid product flows and then descends through the chamber in a curtain-like pattern. The descending product passes a steam inlet provided in the chamber wall and is intermixed with and heated by a controlled amount of entering steam whereby the temperature of the descending product is increased to a predetermined amount. A pump is connected to an outlet formed in the lower portion of the chamber and removes therefrom the mixture of product, condensate, noncondensable gas, and steam so as to prevent an accumulation therein of said mixture while at the same time maintaining a predetermined pressure within the chamber. The discharge side of the pump is connected to an intermixing means causing all of the steam entrained in the product to condense. Upon leaving the intermixing means the mixture of the product, condensed steam and noncondensable gas enters a holding tube and is retained therein for a predetermined interval of time at a predetermined temperature.

9 Claims, 2 Drawing Figures

ULTRAHIGH TEMPERATURE HEATING SYSTEM

BACKGROUND OF THE INVENTION

Various ultrahigh temperature heating systems have heretofore been utilized; however, because of certain inherent structural features they have been beset with one or more of the following shortcomings: (a) it was difficult to maintain a proper liquid seal within certain portions of the system thereby resulting in a loss of steam or an ineffective condensing of the steam within the product prior to the latter being received in a holder tube; (b) approval of the system by various public health authorities for pasteurization of the product was denied because of the inconsistency or instability of the product entering the holder tube (i.e., steam would occupy space normally occupied by the product) and also because of variations in liquid flow whereby the necessary hold time to effect pasteurization could not be accurately determined; and (c) because the steam entrained in the product was not completely condensed prior to entering the holder tube, the noncondensed steam would collapse within the holder tube creating serious mechanical shocks to occur throughout the system thereby resulting in an inordinate amount of damage to various components or premature failure of various fittings.

SUMMARY OF THE INVENTION

Thus, it is an object of the improved system to effectively avoid the aforenoted problems associated with prior systems of this general type.

It is a further object of the improved system to provide a means whereby the various ingredients (i.e., milk, steam, air, etc.) introduced into the system are accurately metered and, thus, heating of the product to a predetermined temperature and maintaining the product at such temperature for a controlled period of time can be readily accomplished and, thus, fulfill the most stringent requirements of various public health authorities regarding pasteurization or sterilization of the product.

It is a further object of the invention to provide an improved ultrahigh temperature heating system wherein an excessive amount of steam is not required during startup of the system.

It is a still further object of the invention to provide an improved ultrahigh temperature heating system which is easy to service and maintain and is capable of accomodating a wide variety of liquid products including small particles in suspension.

Further and additional objects will appear from the description, accompanying drawings and appended claims.

In accordance with one embodiment of the invention, an ultrahigh temperature heating system for a liquid product (e.g., milk) is provided. The system includes an upright chamber into which the product at a predetermined flow rate and first temperature enters and descends through the chamber in a curtain-like pattern. The descending product is intermixed with and heated by a controlled amount of steam introduced into the chamber so that the product removed from the lower portion of the chamber is at an elevated predetermined second temperature. A pump is connected to the chamber outlet and is operated at such a capacity that there is no accumulation of the product and steam within the lower portion of the chamber. The discharge side of the pump is connected to an intermixing means whereby all of the steam is condensed. From the intermixing means the mixture of the product, condensed steam and noncondensable gas is directed to a holding tube wherein it is retained therein at a predetermined temperature for a given interval of time. While disposed within the holding tube, the mixture is maintained at a greater pressure than the pressure within the chamber. A control unit is provided so that the steam entering the chamber will have a constant weight, temperature and pressure.

DESCRIPTION

For a more complete understanding of the invention reference should be made to the drawings wherein FIG. 1 is a schematic diagram of one form of the improved system.

Figure 2:
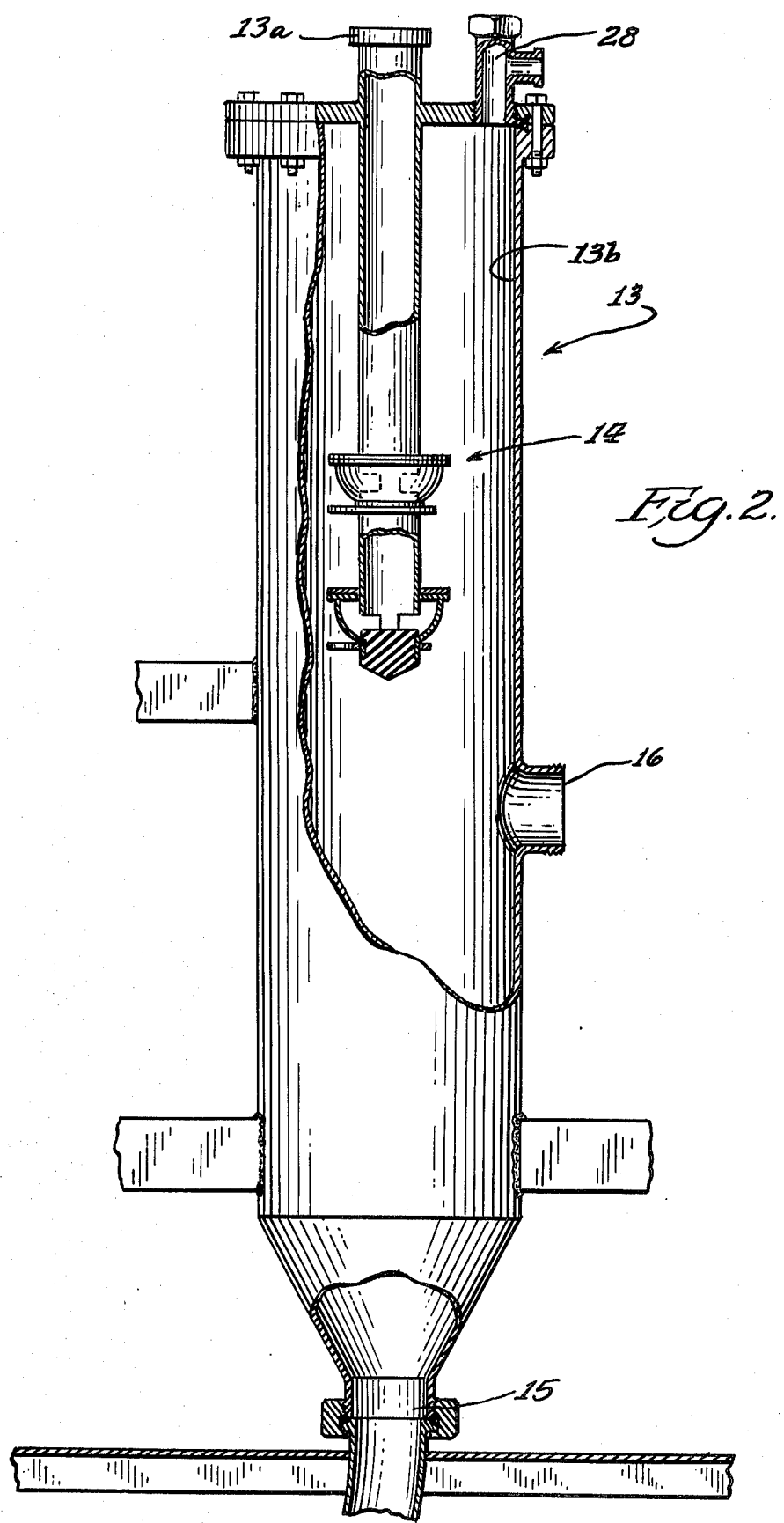

FIG. 2 is an enlarged fragmentary elevational view partially in vertical section of one form of chamber embodied in the system of FIG. 1.

Referring now to the drawings and more particularly to FIG. 1, one form of the improved ultrahigh temperature heating system 10 is shown. The system is adapted to be used for a liquid product (e.g., milk, starches, cream-style corn, cream, etc.); however, for purposes of convenience and understanding the improved system will be described hereinafter in relation to the pasteurization of milk. It is to be understood, of course, that the improved system is not intended to be limited for use with a milk product.

In the illustrated embodiment of the system 10, a milk storage tank 11 is provided from which milk at 170° F. is withdrawn by means of metering pump 12. The pump is preferably a positive type and may be set to pump 6,000 pounds of milk per hour from the storage tank 11 to an inlet 13a formed in the upper end portion of an upright chamber 13, sometimes referred to as a steam infuser, see FIG. 2. Disposed within the chamber 13 and depending from the upper end portion thereof into the chamber interior is a product dispersion member 14 through which the entering product is caused to flow and be dispersed substantially radially therefrom towards the interior surface 13b and descends therealong in a curtain-like pattern. The dispersion member 14 may be of a type disclosed in U.S. Pat. No. 3,156,176. An outlet 15 is formed in the lower end portion of the chamber.

A steam inlet 16 is formed in the chamber surface and located between the lower end of the dispensing member 14 and the outlet 15. The descending curtain of product moves past the steam inlet and is heated by entering steam, the temperature, volume, and pressure of which are accurately controlled in a manner to be herein described in detail.

A second metering pump 17 has the suction side thereof connected to outlet 15. The operating capacity of pump 17 is such that the product and the steam intermixed therewith will not accumulate within the lower end portion of the chamber. Generally in chambers of this general type there is an accumulation of the product and steam within the chamber itself which has prevented or made it extremely difficult to subsequently attain proper condensation of the steam entrained in the product or to maintain liquid seals within the chamber.

The discharge side of pump 17, which increases the pressure above that existing in chamber 13, is connected to a mixer unit 18 wherein the product and any steam entrained therein are mixed so as to complete condensation of the entrained steam. In some instances the metering pump 17 and the mixer unit 18 may be replaced by a single slow speed centrifugal pump, not shown.

From mixer unit 18 the mixture of the product, condensed steam and noncondensable gas, while at a predetermined second temperature, enters a conventional holder tube 20 of a type well known in the art and is retained within the tube for a time interval necessary to effect pasteurization or sterilization of the milk product. Connected to the discharge side of the holder tube 20 is a temperature sensor 21 and a pressure sensor 22 of conventional design. The sensors 21, 22, as seen in FIG. 1, are located upstream of a unit 23 which may be either a pump or valve, either of which is adapted to maintain a predetermined pressure within the holder tube. From unit 23 the pasteurized product may be directed to a vacuum-type flash chamber or the like, not shown, wherein the product temperature is reduced a predetermined amount (e.g., lower than the temperature of the product entering chamber 13).

Sensor 21 is connected by suitable means 24 to a conventional temperature controller-recorder 25. In a similar manner, sensor 22 is connected by suitable means to a pressure controller 27. A signal from controller 27 is transmitted to unit 23 so that the desired pressure will be maintained within the holder tube 20.

In addition to the product inlet 13a, the upper end portion of chamber 13 may be provided with an auxiliary air inlet 28 which is connected to a suitable source, not shown, of sanitary air normally available in a dairy plant. The air inlet 28 provides a means whereby compressed sanitary air may be introduced into chamber 13 to maintain a head space above distributor 14 void of steam to prevent burn on of the product in this area on both chamber 13 and dispersion member 14 when the system is in operation. In some instances the air inlet 28 may not be required where the product entering the chamber has a relatively small amount of compressible gas entrained therein.

In the illustrated embodiment of the improved system 10, the auxiliary sanitary air, prior to reaching inlet 28, must pass successively through a conventional air pressure reducing valve 30, an air differential controller 31, and a check valve 32. The pressure of the plant sanitary air is normally substantially higher than the pressure required within the chamber 13 and, thus, the valve 30 is adapted to maintain a constant, but reduced, pressure of the sanitary air entering the controller 31. The controller accurately meters the volume of air entering the chamber 13.

With regard to the entering steam which is normally generated in a high-pressure boiler, not shown, it will initially encounter a pressure reducing valve 33 wherein the pressure of the steam is reduced to an amount slightly higher than the desired pressure maintained within the chamber 13. Subsequent to passing through valve 33, the steam passes through a de-superheater 34, and then a steam differential controller 35. The de-superheater 34 may take various forms; for example, it may be a length of pipe exposed to ambient temperature or it might be a means for injecting moisture into the steam or effect cooling and substantial saturation thereof prior to entering chamber 13. The controller 35 may be similar in operation and structure to that of the differential controller 31 utilized for the auxiliary sanitary air previously described. The controller 35 accurately meters the volume of steam entering chamber 13.

Connected in parallel relation with controller 35 may be a small capacity valve 36, the adjustment of which is regulated by the temperature controller-recorder 25, the latter sensing by means of sensor 21 the temperature of the product at the outlet of the holder tube 20.

The controls and valves herein described and utilized in combination with chamber 13 are of substantially conventional design, the operation of which is well known by those skilled in this art.

In order to facilitate understanding of the improved system 10, a typical operation of the system utilizing milk as the product being processed will be discussed in greater detail. The milk, for example, at 170° F. is pumped from storage tank 11 to chamber 13 at a rate of 6,000 pounds per hour; the rate of flow being set by pump 12. The milk, while in chamber 13, is heated from 170° F. to a sterilizing temperature of 290° F. Milk normally has a specific gravity of 1.028 and a specific heat of 0.94. Thus, at a flow rate of 6,000 pounds per hour and temperature differential between the entering and discharged product of 120° F., the total load of BTU's per hour required (ignoring radiation losses) is as follows:

$$6{,}000 \text{ lbs./hr.} \times 120° \times 0.94 \text{ (specific heat)} = 676{,}800 \text{ BTU's/hr.}$$

The steam at 290° F. enters at 42.8 psig whereby one pound of steam has the equivalency of 917 BTU's. Thus, if the total load of 676,800 BTU's/hr. is divided by 917, the amount of steam required will be 738 lbs./hr. Steam at such a pressure (42.8 psig) occupies 7.467 cubic feet per pound and, therefore, the volume of steam required per hour is $738 \times 7.467 = 5{,}511$ cubic feet per hour. The resulting condensate from 738 lbs./hr. of steam will occupy 12.3 cubic feet and 6,000 pounds of milk at a specific gravity of 1.028 will occupy 94 cubic feet.

Assuming that the auxiliary sanitary air is entering chamber 13 at a constant rate of one cubic foot per hour at 42.8 psig and that pump 12 delivers at a rate of 14.8 cubic inches per revolution, then, when utilizing the factor of 1,728 cubic inches equals one cubic foot, pump 12 must make 116.75 revolutions per cubic foot. Thus, in order for pump 12 to deliver 94 cubic feet of milk to chamber 13 it will have a rotational speed of $94 \times 116.75 = 10{,}975$ rph or 183 rpm.

In order to be assured during normal operation of the system that there is no accumulation of product and steam in the lower portion of the chamber 13, pump 17 should operate at approximately 10% excess capacity over that required to actually remove from the chamber 13 the mixture of product, steam, and auxiliary air. Thus, the speed of pump 17 is determined as follows:

speed of pump $17 = (T + 10\% \text{ T}) \times R$

T = 94 cu. ft. (product) + 12.3 cu. ft. (condensate) + 1 cu. ft. (auxiliary air) = 107.3

R = revolutions per cubic foot of pump 12 = 116.75

Thus, the speed of pump $17 = 116.75 \times 118 = 13{,}776$ rph or 230 rpm.

As aforementioned, valve 36 is of small capacity and may be automatically set or manually adjusted by the operator to a maximum capacity in order to trim the final temperature of the product being removed from chamber 13. For example, the valve 36 could have a maximum capacity of 10% of the total volume of the steam to be used and, thus, by reason of bypassing controller 35 would compensate for any slight variations which might occur in the product entering the chamber 13 and cannot otherwise be controlled.

When direct steam heating for pasteurizing or sterilizing is used it is often desirable to flash back in a vacuum chamber the product to a temperature equal to or slightly lower than the entering temperature (e.g., 170° F.) to maintain the original density.

The important operating principle of the improved system 10 compared to that of other systems of this general type, is that all the ingredients (e.g., product, steam and auxiliary air) are accurately metered, thus, enabling the operator to control the consistency, temperature, and volume of the product being processed and thereby readily meet the stringent requirements regarding pasteurization and/or sterilization of milk.

The improved system embodies many well known components in a unique way so as to attain results heretofore deemed unattainable. In addition, the improved system avoids the problems of premature failure of valve fittings, seals, etc. commonly experienced with equipment of this general type. The improved system is readily capable of handling and processing a wide variety of diverse liquid products.

I claim:

1. An ultrahigh temperature heating system for a liquid product of known specific gravity and specific heat, said system comprising a source of product at a predetermined first temperature; an upright chamber including a product inlet disposed adjacent the upper end portion thereof and communicating with said source for receiving at a predetermined first flow rate the product at the first temperature, an outlet disposed adjacent the lower end portion of said chamber, and a steam inlet disposed intermediate said inlet and outlet through which a controlled amount of steam at a first pressure and at a predetermined second temperature is adapted to flow into said chamber and intermix with the product descending within said chamber and heat same to the predetermined second temperature; first means connected to said chamber outlet for removing from said chamber the mixture of product and steam at a predetermined second flow rate whereby there is no accumulation of same in the chamber lower end portion; second means for exerting a predetermined second pressure on the product and steam removed from said chamber whereby all of the steam is condensed and mixed with the product; and third means connected to said second means for retaining the mixture of the product and steam condensate for a predetermined time interval and at the second temperature and pressure.

2. The system of claim 1 wherein the product source includes a first pump of known capacity connected to the chamber inlet; and said first means includes a second pump of greater capacity then said first pump and connected to said chamber outlet.

3. The system of claim 1 wherein the steam inlet is connected to a control assembly disposed upstream thereof, said assembly being adapted to maintain the entering steam at a constant weight and pressure and at said predetermined second temperature.

4. The system of claim 1 wherein said third means includes a holder tube.

5. The system of claim 3 wherein the control assembly includes a steam differential controller and an adjustable bypass valve associated therewith wherein steam is adapted to flow either through said controller or simultaneously through said controller and bypass valve prior to flowing through said steam inlet, said valve having a maximum flow capacity substantially less than that of said steam inlet.

6. The system of claim 5 wherein the adjustment of said bypass valve is responsive automatically to the temperature of the product and steam condensate retained in said third means.

7. The system of claim 1 wherein upright chamber includes an auxiliary gas inlet adjacent the upper end portion thereof, said gas inlet being adapted to be in communication with a source of gas at a pressure greater than the pressure to be maintained within the chamber.

8. The system of claim 7 wherein the auxiliary gas inlet is connected to a gas differential controller disposed upstream thereof.

9. The system of claim 1 wherein the chamber product inlet includes means for effecting a curtain-like dispersion of the product towards the interior surface of the chamber prior to the product descending past said steam inlet.

* * * * *

UNITED STATES PATENT AND TRADEMARK OFFICE
CERTIFICATE OF CORRECTION

PATENT NO. : 4,161,909

DATED : July 24, 1979

INVENTOR(S) : ALDEN H. WAKEMAN

It is certified that error appears in the above-identified patent and that said Letters Patent are hereby corrected as shown below:

Column 6, claim 7, line 31 - --disposed-- should be inserted after "inlet"

Signed and Sealed this

Thirtieth Day of October 1979

[SEAL]

Attest:

RUTH C. MASON
Attesting Officer

LUTRELLE F. PARKER
Acting Commissioner of Patents and Trademarks